(12) United States Patent
Blackwell et al.

(10) Patent No.: US 7,805,229 B1
(45) Date of Patent: Sep. 28, 2010

(54) ENGINE SPEED CONSTRAINED ACCESSORY CONTROL

(76) Inventors: Donald A. Blackwell, 19534 Vineyard La., Saratoga, CA (US) 95070-4556; Paul C. Abrahams, 3400 Stevenson Blvd., Apt. W31, Fremont, CA (US) 94538

( * ) Notice: Subject to any disclaimer, the term of this patent is extended or adjusted under 35 U.S.C. 154(b) by 0 days.

(21) Appl. No.: 12/618,761

(22) Filed: Nov. 15, 2009

(51) Int. Cl.
*G06F 7/00* (2006.01)
(52) U.S. Cl. ............................. 701/36; 701/33; 701/54; 123/297
(58) Field of Classification Search .................. 701/33, 701/35, 36, 54; 123/297
See application file for complete search history.

(56) References Cited

U.S. PATENT DOCUMENTS

| | | | | |
|---|---|---|---|---|
| 5,222,469 | A | * | 6/1993 | Sutton .................. 123/198 DC |
| 6,234,155 | B1 | * | 5/2001 | Brothers et al. ............. 123/586 |
| 2007/0228735 | A1 | * | 10/2007 | Becker ...................... 290/40 C |
| 2009/0230680 | A1 | * | 9/2009 | Becker .......................... 290/7 |

* cited by examiner

*Primary Examiner*—Gertrude Arthur Jeanglaud

(57) ABSTRACT

A control method for high power accessory loads that is established by engine speed wherein a microcontroller and associated process control algorithm controls the state of a relay which in turn prevents the accessory loads from turning on until the engine speed reaches a set threshold. An optional accessory switch may be included to provide the ability to prevent the accessory from turning on regardless of engine speed.

9 Claims, 3 Drawing Sheets

ENGINE SPEED CONSTRAINED ACCESSORY CONTROL

FIELD OF INVENTION

This invention relates to electrical accessory control for motorcycles, all terrain vehicles, snowmobiles and other vehicle commonly referred to as powersports vehicles and also but not limited to other special purpose vehicle such as golf carts and powered wheel chairs.

BACKGROUND OF INVENTION

Owners and users of motorcycles, all terrain vehicles, snowmobiles, commonly called powersports vehicles and other special purpose vehicles such as golf carts and powered wheel chairs are frequently modified from their original equipment manufactured configuration to add a variety of accessories that enhance the vehicle capability and the operator's experience. These added accessories may be roughly divided into three categories: low power up to 2 amp or 20 watts, medium power of 2 to 5 amps or 20 to 60 watts and high power of 6 amps or 80 watts and greater. Examples of low power accessories may include navigation systems such as global positioning systems, cell phones, entertainment systems, radar detectors, intra-vehicle rider to passenger communication systems, inter-vehicle short range communication systems, personal digital assistants and small computers. Medium power accessories may include on-road auxiliary lighting and single articles of heated clothing. High power devices may include high intensity off-road lighting, external battery chargers and multiple articles of heated clothing Care must be exercised when adding accessories to vehicles to ensure that the electrical capacity of the vehicle system is not exceeded. Both the battery and charging system must be considered when evaluating electrical loads. Calculating the electrical load effect on the charging system is straight forward as it is related only to the output capacity of the charging device; almost always an alternator in most vehicles. However, the effect of added load on a battery is problematic in that battery output can be significantly affected by temperature and battery condition. For example the greatest battery load is under starting conditions at low temperatures. At low temperatures engine cranking loads are high due to increase lubricant viscosity and component friction. At the same time battery output is reduced by the low temperature. It is therefore worthwhile to disconnect unnecessary electrical loads during engine cranking.

Simply switching high power accessories off during cranking is one option; however it is unrealistic to expect a user to switch these devices off before initiating the starting process. The only way to ensure consistent disconnect is to automate the action.

In the simplest form the disconnection could be accomplished with a relay with normally closed contacts. Activating the relay by means of the start function would open the relay contacts and thus disconnecting the electrical load. This method has a major drawback. It allows the electrical load to discharge the battery from the time the vehicle ignition is turned on to a point when the start function is initiated.

Moreover, this on-off-on load sequence may have a negative effect on some accessories. A case in point is high intensity discharge (HID) lighting. HID lights are illuminated by an arc that is formed across contacts. Igniting this arc requires very high voltage and moderately high current. Igniting the arc when the ignition is turned on, then extinguishing it during starting only to reignite when the engine starts can be deleterious to the igniter and arc contacts.

Given the above, it is clear that it would be of significant advantage to prevent unnecessary accessory electrical loads from turning on until the engine was running at sufficient speed to ensure that the charging system is providing sufficient output to handle those loads. This control may be implemented is various ways: by time delay, by monitoring oil pressure or by monitoring engine speed. As will be shown, the only effective method is the monitoring of engine speed.

A time delay method is not reliable due to the variable time that is required to ensure that the engine is running. If the set time is too short the accessory may turn on while the engine is cranking. If the time is too long the operator may have to wait for the accessory to turn on before operating the vehicle. This could lead to dangerous situations such as a stall in traffic at night.

Controlling the accessory load with oil pressure is equally unreliable. If the threshold pressure is set too low the engine cranking speed may be sufficient to bring the oil pressure up to a point where the accessory may turn on. If set too high the accessory may turn off when the engine speed drops below the threshold such as at engine idle. This again could be extremely dangerous during nighttime operation.

Controlling the accessory load with engine speed or charging system output overcomes these drawbacks. Setting the threshold engine speed at a point between engine cranking and low idle ensures that the engine is running at sufficient speed in order that the charging system is generating enough output to support the added accessory load.

SUMMARY OF THE INVENTION

To achieve the above objectives, and in accordance with the purpose of the invention broadly described herein to provide a control method for accessory loads that is established by engine speed or charging system output. This control is achieved by means of a relay that is activated by a microcontroller circuit utilizing the appropriate engine input signal.

DETAILED DESCRIPTION OF THE INVENTION

Reference will now be made in detail to the present embodiments of the invention as illustrated in the accompanying figures.

Figure 1:
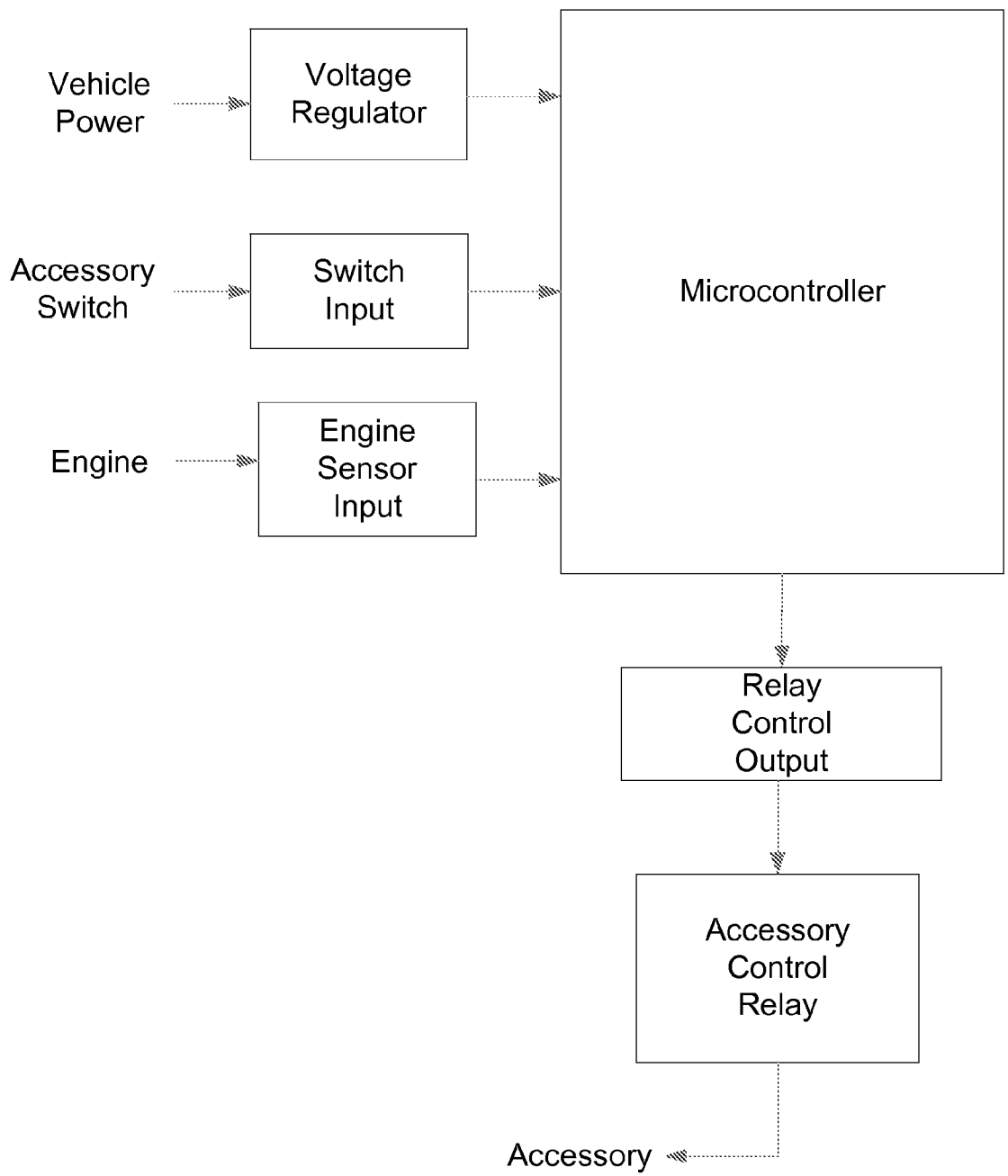
FIG. 1 shows a block diagram of the system.

Referring to FIG. 1 it can be seen that the system consists of five basic sections: microcontroller, voltage regulator, an optional accessory switch input, engine sensor input, relay control output and accessory control relay. Taking each of these sections separately their function is as follows:

The microcontroller is the heart of the system. A wide range of suitable microcontrollers are available from a variety of sources. Suitable microcontrollers are available in several different component package styles including through hole and surface mount types and are offered with different contact pin counts with 8, or 16 pins being the most common. All of the available microcontroller share common features. They are small in size, low power consumption, very versatile, easy to program and contain all of the memory and control devices internally to their architecture that are required for process applications. Anyone skilled in the art can utilize these features to implement the system described in this invention.

An exemplary microcontroller has been selected to further develop the features of the invention. This microcontroller is an 8 pin device available in both through-hole dual inline package (DIP) and three surface mount package types. The microcontroller is a low power device running on a voltage range of 2.0V to 5.5V with current requirements in the low micro amps. The manufacturer provides a high level programming application at no cost along with low cost programming and debugging hardware.

The voltage regulator reduces the vehicle voltage, typically 12 volts nominal, to the lower voltage required by the microcontroller, typically a range of 2.0 volts to 5.5 volts depending on the particular microcontroller used. Since microcontrollers are very low current devices, the use of a simple linear voltage regulator is practical with power and heat loss negligible.

The optional accessory switch input is determined by the rider's selected accessory condition—on or off. The circuit switch input section may include a voltage divider to condition the switch voltage to match that of the microcontroller input. If the optional accessory switch is not present the process algorithm is initiated by the power source.

The engine sensor input is the key to this invention as previously described. Again, some input signal conditioning may be required to match sensor voltage to microcontroller voltage.

A relay control device section is required in order to convert the low current signal from the microcontroller to high enough current to switch the relay.

Lastly, a relay is switched on or off to provide the high current necessary to operate the accessory.

In order to produce an effective control code algorithm a set of use cases must be developed to ensure that full accessory capability is met. Table 1 lists the appropriate use cases for a basic application that does not include the optional accessory switch. Each use case is self explanatory.

TABLE 1

Control system without optional accessory switch

Use case 1 (Primary use case.)
Turn on ignition.
Accessory off
Crank engine
Engine starts, reaches 300 rpm
Accessory turns on.
Use case 2
User wants accessory on without engine running.
Turn ignition on and wait 10 seconds.
Accessory turns on.
Use case 3
Accessory on
Engine running.
User kills engine off (ignition still on).
Accessory stays on.
Use case 4
Turn on ignition.
Accessory stays off.
Crank engine.
Engine does not start.
Accessory stays off regardless of how long engine cranks or how many times the user resumes cranking.
Use case 5
Ignition on.
User cranks engine but does not start.
User wants accessory on without the engine running
Turn the ignition off and then on
Accessory will turn on after 10 sec delay.

Table 2 lists the appropriate use cases for a more complex application that includes the optional accessory switch. Again, each use case is self explanatory.

TABLE 2

Control system with optional accessory switch

Use case 1 (Primary use case.)
Accessory switch on.
Turn on ignition.
Accessory stays off
Crank engine
Engine starts, reaches 300 rpm
Accessory turns on.
Use case 2
User wants accessory on without engine running.
Turn ignition on and wait 10 seconds.
Accessory turns on.
Use case 3
Accessory switch off
Engine running.
User turns accessory switch on.
Accessory turns on.
Use case 4
Accessory on
Engine running.
User turns accessory switch off.
Accessory turns off.
Use case 5
Accessory on
Engine running.
User kills engine off (ignition still on).
Accessory stays on.
Use case 6
Accessory switch on.
Turn on ignition.
Accessory stays off.
Crank engine.
Engine does not start.
Accessory stays off no matter how long engine cranks or how many times the user retries cranking.
Use case 7
Accessory switch on.
Turn on ignition.
Accessory stays off
Crank engine.
Engine does not start.
Accessory stays off no matter how long engine cranks or how many times the user resumes cranking.
User turns off accessory switch while cranking.
Accessory stays off.
Use case 8
Accessory switch on
Ignition on
User cranks engine but does not start.
User wants accessory on without the engine running
Turn the ignition off and then on
Accessory will turn on after 10 sec delay.

Figure 2:
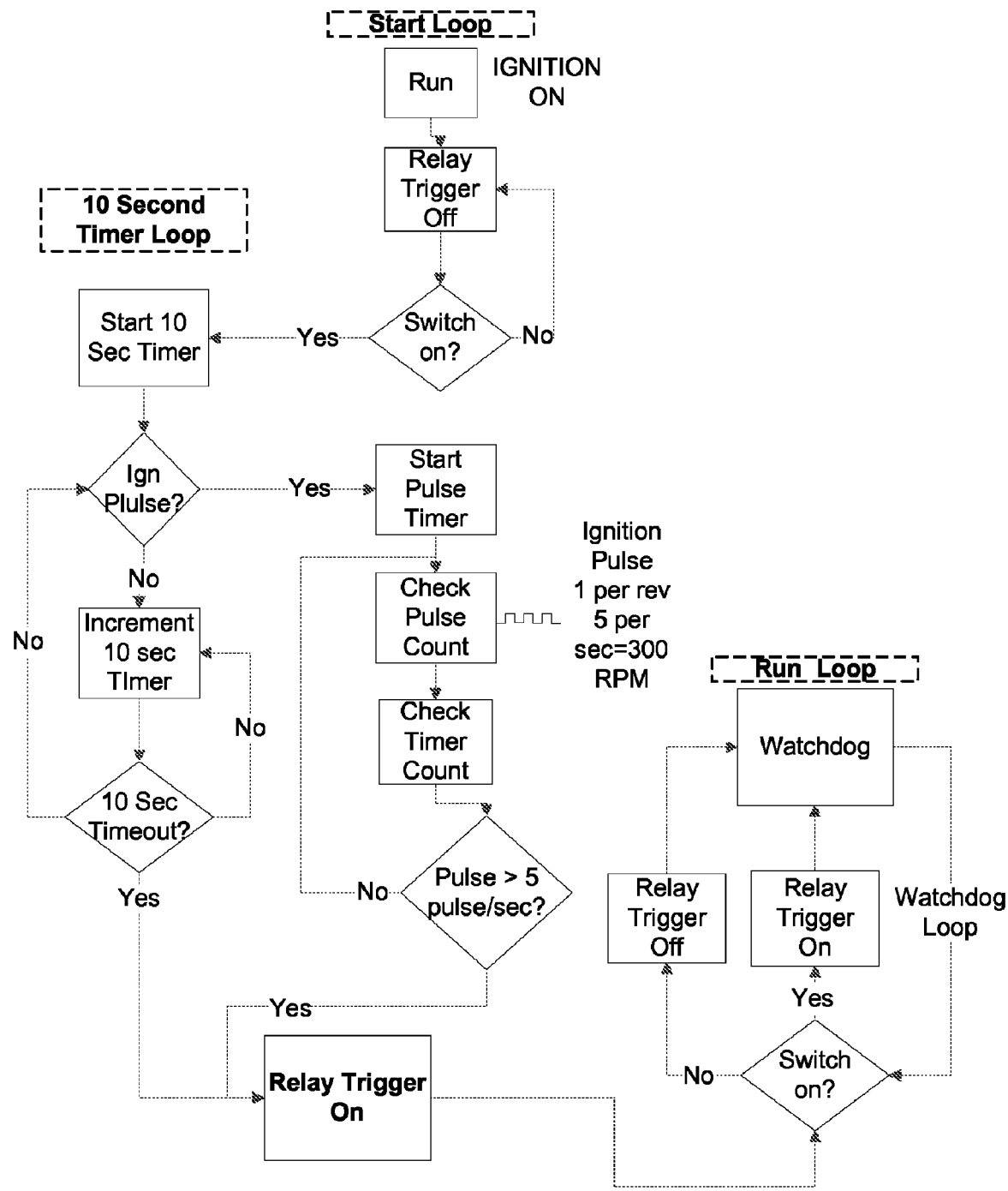
FIG. 2 shows a flow diagram of the system code algorithm.

With the use cased defined it becomes a straight forward task of developing a flow diagram from which the actual process code algorithm can be generated. FIG. 2 shows the flow diagram for the uses cases defined in tables 1 and 2. Each section of the flow diagram can be traced through the matching use case.

With the flow diagram complete it is a straight forward task to generate the process code algorithm necessary to provide the physical control process. Given the wide variety of available microcontrollers, each with their own programming functions, listing actual code is not practical or of any advantage. Programming a particular microcontroller using the tools provided by the microcontroller supplier is a task easily accomplished by anyone schooled in the art.

Figure 3:
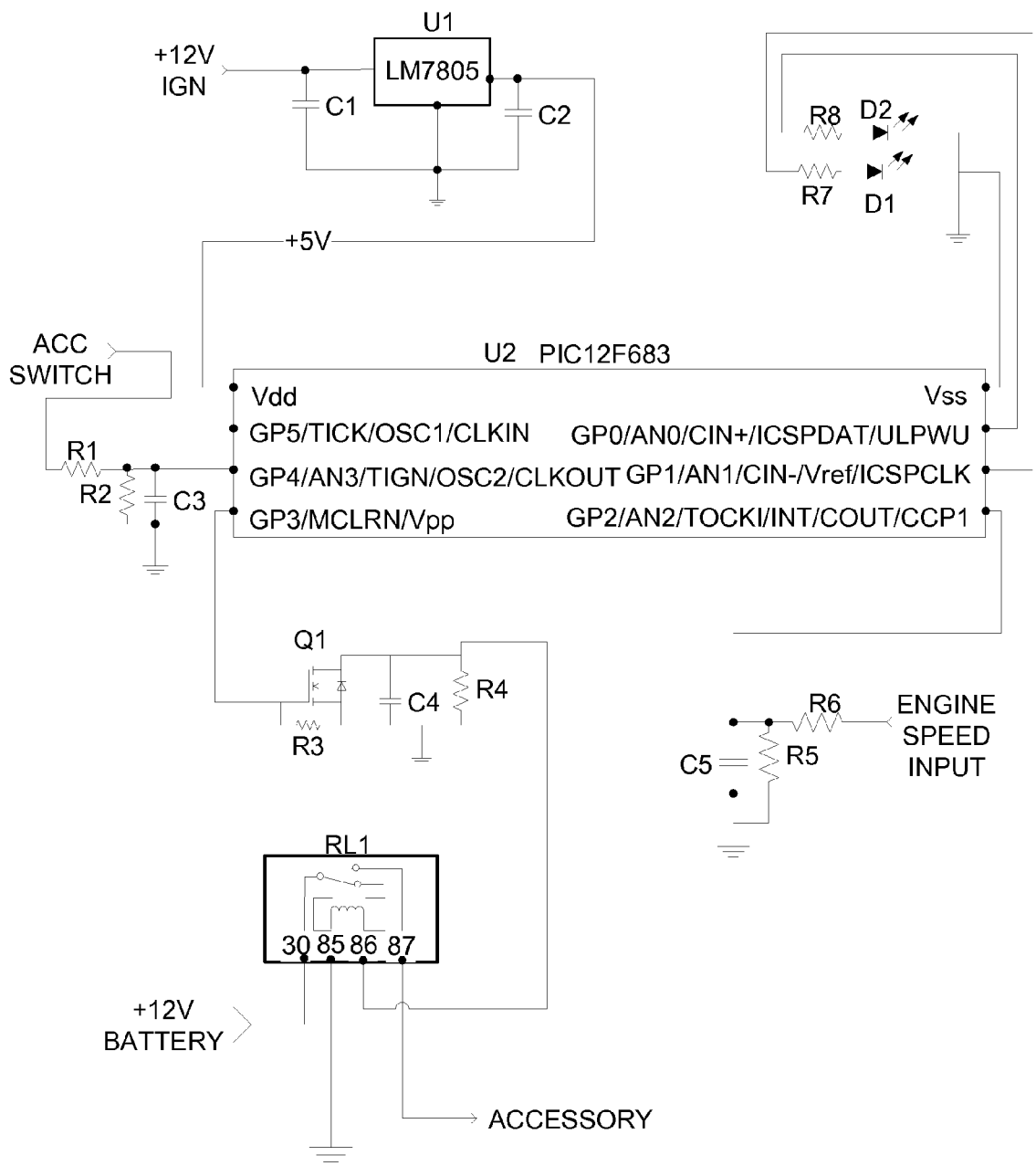
FIG. 3 shows an exemplary circuit diagram.

FIG. 3 shows an exemplary electrical schematic diagram. All component values are dependent on the particular microcontroller selected and thus are not shown. Referring to FIG.

1, U1, C1 & C2 comprise the voltage regulator section. U2 shows the microcontroller. R1, R2 and C3 condition the optional accessory switch input to ensure a clean signal of the correct voltage is supplied to the microcontroller. Q1, R3, R4 and C4 is the relay control MOSFET circuit. R5, R6 and C5 condition the engine speed input to ensure a clean signal of the correct voltage is supplied to the microcontroller. Relay RL1 provides the actual accessory control based on the state determined by the process control algorithm. Two optional Light Emitting Diodes (LED) sections are shown as R7 and D1, and R8 and D2. These LED circuits take advantage of unused microcontroller input/output sections and can be utilized to indicate process status or provide some fault debugging.

It is evident from the above description that the system has a substantial capability for adaptability to meet a variety of applications. Hardware adaptations such as the optional accessory switch and status LEDs are easily implemented. Similarly, changes to the process control algorithm provide use case flexibility. Accordingly, additional advantages and modifications will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

What is claimed is:

1. An accessory control system comprising:
   a relay activated by a microcontroller which in turn utilizes vehicle engine speed input derived from tachometer or battery charging system state inputs to determine when an accessory load should be turned on.

2. The accessory control system of claim 1 wherein the function of said microcontroller is determined by process control algorithm that provides the necessary use cases.

3. The accessory control system of claim 1 wherein said process control algorithm provides an emergency timed turn on condition of said accessory regardless of engine speed.

4. The accessory control system of claim 1 wherein said process control algorithm maintains said accessory in an on status after engine run status is established regardless of engine speed.

5. The accessory control system of claim 2 wherein the function of said microcontroller is determined by process control algorithm that provides the necessary use cases.

6. The accessory control system of claim 2 wherein said process control algorithm provides an emergency timed turn on condition of said accessory regardless of engine speed.

7. The accessory control system of claim 2 wherein said process control algorithm maintains said accessory in an on status after engine run status is established regardless of engine speed.

8. The accessory control system of claim 2 wherein said accessory switch status determines whether or not said microcontroller process algorithm runs through its normal control sequence or remains in an off condition.

9. An accessory control system comprising:
   a relay activated by a microcontroller which in turn utilizes combination of an accessory switch and the vehicle engine speed input derived from tachometer or battery charging system state inputs to determine when an accessory load should be turned on.

* * * * *